(12) United States Patent
Ouyang

(10) Patent No.: US 10,560,481 B2
(45) Date of Patent: Feb. 11, 2020

(54) STEREOTYPING FOR TRUST MANAGEMENT IN IOT SYSTEMS

(71) Applicant: SAP SE, Walldorf (DE)

(72) Inventor: Kun Ouyang, Singapore (SG)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 15/625,029

(22) Filed: Jun. 16, 2017

(65) Prior Publication Data

US 2018/0367573 A1 Dec. 20, 2018

(51) Int. Cl.
*H04L 29/06* (2006.01)
*H04W 12/08* (2009.01)
*H04W 12/00* (2009.01)
*H04W 4/70* (2018.01)

(52) U.S. Cl.
CPC ............ *H04L 63/20* (2013.01); *H04L 63/102* (2013.01); *H04W 12/08* (2013.01); *H04W 4/70* (2018.02); *H04W 12/005* (2019.01); *H04W 12/00506* (2019.01)

(58) Field of Classification Search
CPC ...................................................... H04L 63/20
USPC ............................................................ 726/1
See application file for complete search history.

(56) References Cited

U.S. PATENT DOCUMENTS

| 8,621,215 | B1* | 12/2013 | Iyer | G06Q 20/10 |
| | | | | 713/169 |
| 2015/0310351 | A1* | 10/2015 | Caplan | G06N 20/00 |
| | | | | 706/12 |
| 2017/0171180 | A1* | 6/2017 | Britt | H04L 63/08 |

OTHER PUBLICATIONS

Burnett et al. "*Bootstrapping Trust Evaluations through Stereotypes*", Proc. of 9th Int. Conf. on Autonomous Agents and Multiagent Systems (AAMAS 2010), van der Hoek, Kaminka, Lesperance, Luck and Sen (eds.), May 10-14, 2010, Toronto, Canada, 8 pages.
Zhou, Peng et al. "*A Priori Trust Inference with Context-Aware Stereotypical Deep Learning*", The Shanghai Key Laboratory of Power Station Automation Technology, School of Mechatronic Engineering and Automation, Shanghai University, Sep. 17, 2015, 12 pages.

\* cited by examiner

*Primary Examiner* — Anthony D Brown
(74) *Attorney, Agent, or Firm* — Fish & Richardson P.C.

(57) ABSTRACT

Methods, systems, and computer-readable storage media for a trust management system (TMS) in connected devices including a service provider device and a service consumer device, actions including receiving, by the TMS, side information associated with the service provider device, the side information including profile data and context data, processing, by the TMS, the side information using a computer-executable stereotype model to determine a prior trust value, determining, by the TMS, a trust value using a computer-executable experiential trust model, and at least partially based on the prior trust value, and selectively conducting a transaction between the service consumer device, and the service provider device based on the trust value.

20 Claims, 5 Drawing Sheets

STEREOTYPING FOR TRUST MANAGEMENT IN IOT SYSTEMS

BACKGROUND

The so-named Internet-of-Things (IoT) can be generally described as the inter-networking of assets (e.g., physical devices, vehicles, buildings, and other items) that are embedded with electronics, software, sensors, actuators, and network connectivity to enable the assets to collect and exchange data. Such interconnected assets are commonly referred to as connected devices, and/or smart devices.

As IoT systems evolve, connected devices are expected to perform more and more intelligence at the local-level. It is envisioned that, for example, as artificial intelligence (AI) and IoT technologies develop, individual IoT devices can initiate interactions for service discovery and service composition, without human intervention. For example, a smart watch could request wireless charging services without bothering the user, when there are one or more wireless chargers available in the ambient environment. To achieve this, the IoT device would select a target device (agent). Selection of a target device, however, should be based on the agent's trustworthiness. A trust management system can play a critical role in this aspect.

In traditional IoT paradigms, trust management systems do not include an intelligent means of boot-strapping a priori trust. Instead, trust management systems use either a fixed and intuitive number to evaluate the a priori trust of an agent (e.g., zero (0) for no trust, and 0.5 for a trust attitude of ignorance). However, such fixed values often do not accurately represent the eventual deserving trust value (ground truth) of the agent. Moreover, this boot-strapped a priori trust value is of great significance in the decision making for the first few interactions towards the agent, and is particularly important in the IoT ecosystems where agents usually form ephemeral ad hoc interactions.

SUMMARY

Implementations of the present disclosure are generally directed to trust management in Internet-of-Things (IoT) systems. More particularly, implementations of the present disclosure are directed to providing intelligent a priori trust in a trust management system (TMS) based on stereotyping IoT assets. In some implementations, actions include receiving, by the TMS, side information associated with the service provider device, the side information including profile data and context data, processing, by the TMS, the side information using a computer-executable stereotype model to determine a prior trust value, determining, by the TMS, a trust value using a computer-executable experiential trust model, and at least partially based on the prior trust value, and selectively conducting a transaction between the service consumer device, and the service provider device based on the trust value. Other implementations of this aspect include corresponding systems, apparatus, and computer programs, configured to perform the actions of the methods, encoded on computer storage devices.

These and other implementations can each optionally include one or more of the following features: the side information further includes social data representative of a relationship between an owner of the service provider device, and an owner of the service consumer device; the profile data includes one or more of hardware model, owner, and remaining energy of the service provider device, and the context data comprises one or more of location, time, temperature, humidity, and light; selectively conducting a transaction between the service consumer device, and the service provider device based on the trust value includes determining that the trust value exceeds a trust value threshold, and in response, conducting the transaction; the transaction includes communicating data between the service consumer device, and the service provider device; the stereotype model at least partially includes a very fast decision tree (VFDT); and the trust management system is at least partially executed by each of the service consumer device and the service provider device.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to trust management in Internet-of-Things (IoT) systems. More particularly, implementations of the present disclosure are directed to providing intelligent a priori trust in a trust management system (TMS) based on stereotyping IoT assets. Implementations can include actions of receiving, by the TMS, side information associated with the service provider device, the side information including profile data and context data, processing, by the TMS, the side information using a computer-executable stereotype model to determine a prior trust value, determining, by the TMS, a trust value using a computer-executable experiential trust model, and at least partially based on the prior trust value, and selectively conducting a transaction between the service consumer device, and the service provider device based on the trust value.

As described in further detail herein, implementations of the present disclosure provide a priori trust in trust management systems (TMSs) using a stereotypical trust model to provide intelligent prior trust estimation. A stereotype can be described as a mapping from features of a target agent (e.g., an IoT device that is to provide a service) to a trust value. In IoT ecosystems, there exists a number of different types of so-called side information that are available. As described in further detail herein, side information can include profile information (e.g., brand, hardware model), environmental context (e.g., temperature, location), and social relationship that inherits from the social relationships between the device owners. In accordance with implementations of the present disclosure, this side information is leveraged to infer the trustworthiness of the target agent in the sense that the service quality of the target agent usually (significantly) correlates with the target agent's features. Consequently, in the practical system, it is assumed that such correlation exists, and the correlation is used to bootstrap the a priori trust of the target agent.

In some implementations, and as described in further detail herein, in order to determine the function of such correlation, a machine learning algorithm is implemented to learn from the feature data, and an online training process is conducted after each interaction. The trained machine learning model is used as the stereotyping function. In instances where a trust estimation is requested for a target agent, the stereotyping model provides a predicted trust based on the observed side information of the target agent. In some examples, to label the observed side information data for supervised machine learning, an updated trust estimation provide by an experiential trust model can be used. This guarantees the semantic coherence of stereotypical trust, and the experiential trust. In some examples, a very fast decision tree (VFDT) algorithm is used as the machine learning model.

Figure 1:
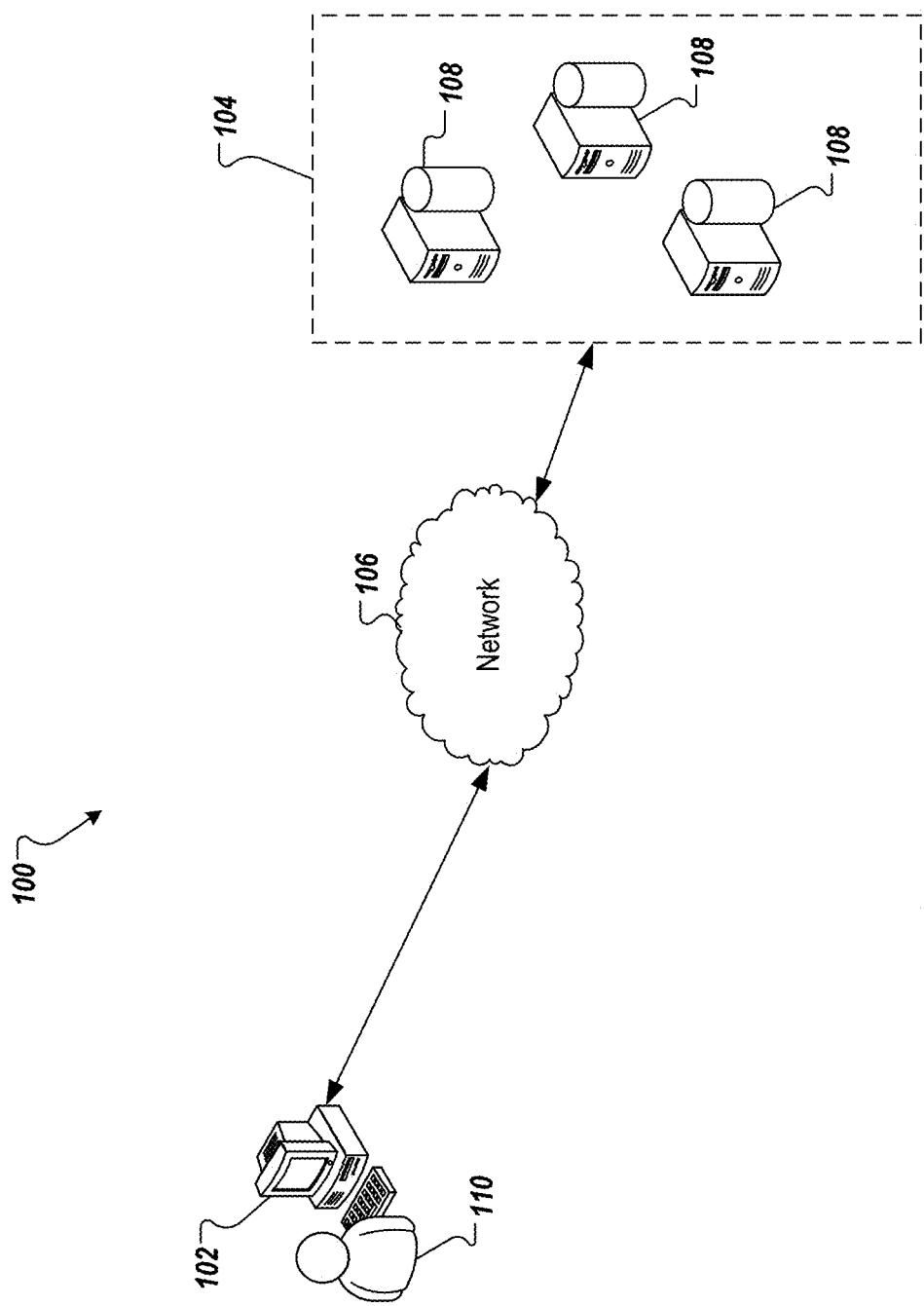
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a trust management service (e.g., provided as one or more computer-executable programs executed by one or more computing devices). For example, input data can be provided to the server system (e.g., from the client device 102), and the server system can process the input data through the trust management service to provide trust data for IoT devices. For example, the server system 104 can send the trust data to one or more IoT devices (not shown) over the network 106 to enable two or more IoT devices to communicate with one another (e.g., share data). In some examples, the trust data includes a trust score for a particular IoT device that can be used for determining whether another IoT device communicates with the particular IoT device.

As introduced above, implementations of the present disclosure provide a trust management system that includes a stereotype model for intelligent provision of a priori trust. More particularly, implementations of the present disclosure provide for the application of stereotypical trust for evaluating a priori trust toward an IoT device of a service provider, also referred to herein as an owner. In some examples, a set of owners is denoted as $O=\{o_1, o_2, \ldots, o_N\}$ with the cardinality N. Example owners can include an organization, an enterprise, a store, and an individual IoT user. Each owner $o_i$ possesses a set of IoT devices denoted as $D_i=\{d_1{}^i, d_2{}^i, \ldots, d_k{}^i\}$ for arbitrary k. Each IoT device can maintain a trust estimation list denoted as $T_k{}^i=\{t_k{}^{i \rightarrow j} | j \in (Z^M \setminus i), k \in Z\}$ to all or partial devices it has previously interacted with. In some implementations, a service transaction occurs when a service consumer (SC) device moves inside the communication range of a service provider (SP) device. In some examples, an owner can either be a user (e.g., consumer of a service provider), or a service provider in different transactions. For example, a non-mobile owner with a large set of IoT devices can emulate a shopping mall, and serves as an SP, while this owner can also request service from other SPs who are in service range, and act as an SC in other transactions.

In some implementations, each device $d_k{}^i$ processes a profile $P_{d_k{}^i}$, a set of contextual attributes $C_{d_k{}^i}$, and a set of social attributes $S_{d_k{}^i}$. In some examples, the profile $P_{d_k{}^i}$ includes device-specific information, such as hardware model, owner, remaining energy, and the like. In some examples, the set of context attributes $C_{d_k{}^i}$ includes contextual information that generally appears in IoT systems. Example contextual information can include location, time, service types, and the like. In some examples, the set of social attributes $S_{d_k{}^i}$ describes the social relation between a SC owner $o_c$ and the SP owner $o_s$. The entire so-called side information set can be denoted as:

$$I_k{}^i = \{P_{d_k{}^i} \lor C_{d_k{}^i} \lor S_{d_k{}^i}\}$$

In some implementations, the side information set $I_k^i$ of the SP device $d_k^s$ is observable by the SC device $d_k^c$. In accordance with implementations of the present disclosure, an objective is to utilize the side information set to infer the prior trustworthiness $t_k^{c \to s}$ of $d_k^c$ towards $d_k^s$. In other words, implementations of the present disclosure identity a stereotype function that maps the side information set $I_k^s$ of the SP to a particular trust value, which can be denoted as:

$$\text{Stereotype: } f_s(I_k^s) \to t_k^{c \to s}$$

Figure 2:
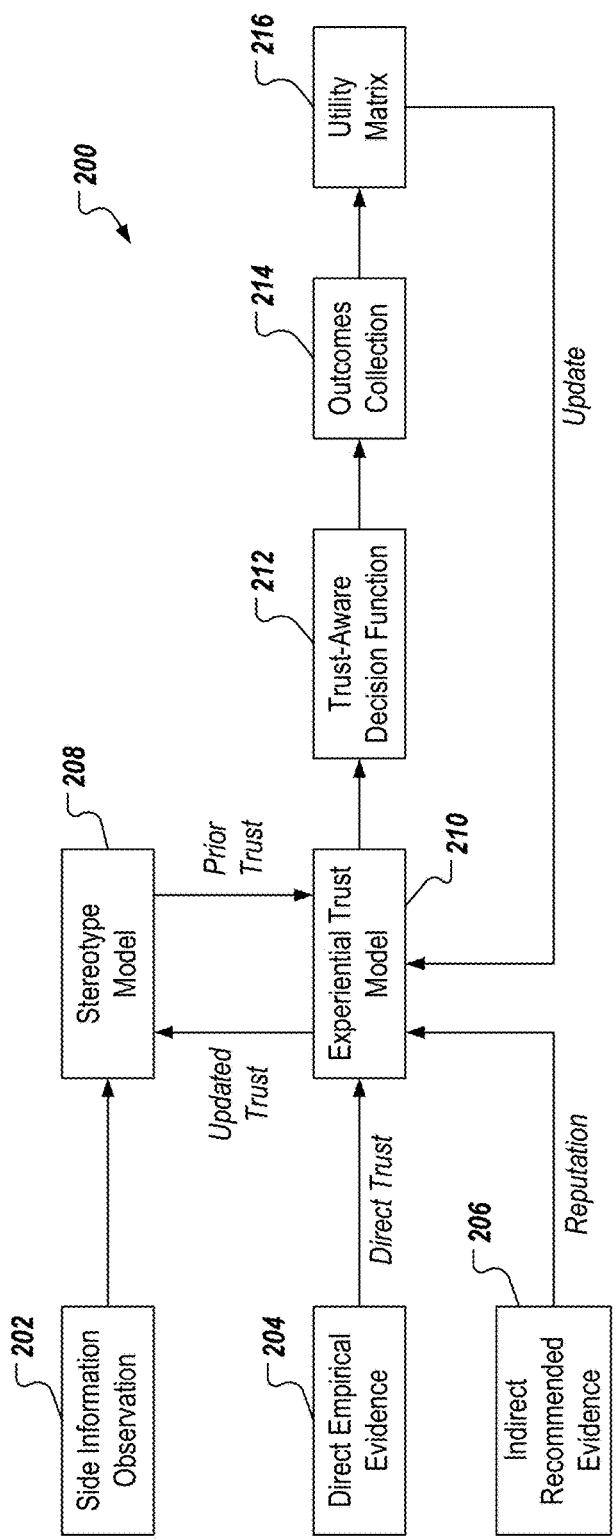
FIG. 2 depicts an example conceptual architecture of a trust management system in accordance with implementations of the present disclosure.

FIG. 2 depicts an example conceptual architecture of a trust management system (TMS) 200 in accordance with implementations of the present disclosure. In the example of FIG. 2, the example TMS 200 includes side information observation 202, direct empirical evidence 204, indirect recommended evidence 206, a stereotype model 208, an experiential trust model 210, a trust-aware decision function 212, an outcomes collection 214, and a utility matrix 216. As representative in the example of FIG. 2, in a real world trust management scenario, the trustor gathers evidence from multiple sources to evaluate the trustee. Such sources include the direct empirical evidence 204, and the indirect recommended evidence 206, which are provided as input to the experiential trust model. In general, and as described in further detail herein, the TMS 200 of FIG. 2 can provide a determination as to whether a trustor (e.g., IoT device of a SC) should interact with a trustee (e.g., IoT device that provides a service of the SP).

In some examples, the direct empirical evidence 204 is provided from the trustor's personal interaction records (e.g., own database of interactions with trustees) with the trustee. The direct empirical evidence 206 can be processed to determine a direct trust value. If other agents (e.g., third-party trustors) are willing to serve as a referee, the trustor can request their interaction records (i.e., the indirect recommended evidence 206), which can be processed to provide indirect trust value(s), or reputation(s). In some examples, the direct trust value and the indirect trust value(s) can be aggregated to provide a trust assessment. In some examples, each indirect trust value can be assigned a weight for aggregation with the direct trust value (e.g., indirect trust values can be weighted differently, depending on the source (trustors); the indirect trust value(s) can be weighted, such that the direct trust value has more influence on the aggregation).

Using both direct trust and reputation, the experiential trust model 210 produces a trust score representative of a trustworthiness of a trustee (e.g., IoT device that provides a service of the SP). In some examples, the trust score is processed by the trust-aware decision function 212 to determine whether the trustor is to interact with the trustee. In some implementations, the trust-aware decision function 212 includes a threshold, and, whenever the trust score exceeds the threshold, the trustor determines to interact with the trustee in a transaction. An example transaction can include communicating data to/from the trustor and the trustee. In some examples, a transaction produces the outcomes collection 214 (e.g., objective outcomes). Example outcomes can include transaction delays, malicious intrusions detected, etc. The utility of the outcome(s) can be assessed based on the (subjective) utility matrix 216. The results of this assessment can be provided as an update to the experiential trust model 210.

In accordance with implementations of the present disclosure, a prior trust value can be provided from the stereotype model 208 for processing with the direct trust value and indirect trust value(s) by the experiential trust model 210 to provide the trust value. In some examples, the prior trust is determined based on the side information observation 202, introduced above, and any updated trust (e.g., provided based on an update from the utility matrix 216). In some examples, and in general, the trustee (SP) will have correspondingly differentiated probability for offering full-fledged service, as represented by different patterns of the trustee. In other words, these patterns have latent influence on the behavior of the trustee, and therefore, influence the estimated trust.

Figure 3:
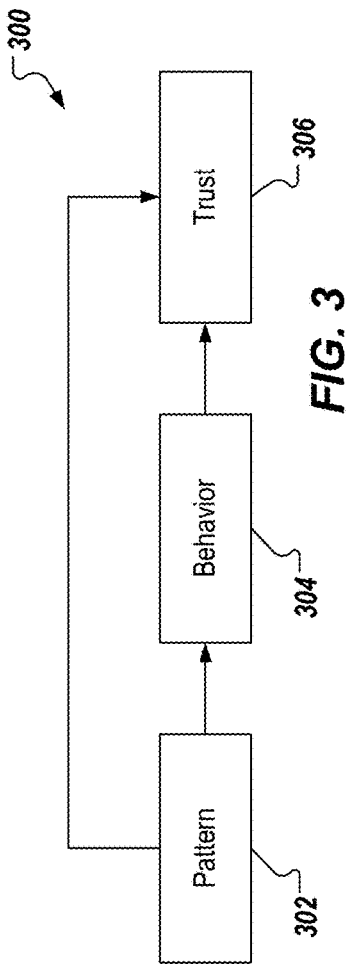
FIG. 3 depicts an example inference in accordance with implementations of the present disclosure.

FIG. 3 depicts an example inference 300 in accordance with implementations of the present disclosure. The example inference 300 of FIG. 3 is representative of the latent influence patterns have on the behavior of the trustee. In short, FIG. 3 depicts the inference 300 between a pattern 302, a behavior 304, and trust 306.

Referring again to FIG. 2, and in some implementations, the stereotype model 208 can provide a direct inference from the patterns (side information) to the trust assessment, while skipping the inference process through behavior. An example experiment, described in detail below, uses data from a real-world IoT system to showcase the viability of such direct inference. In the present disclosure, and as described in further detail herein, the stereotype model of the present disclosure is provided through supervised machine learning techniques, in which the machine learning algorithms learn the target stereotype function through the training process, and provide trust estimation at the prediction process.

In accordance with implementations of the present disclosure, training data is provided and is used to train a machine learning model. Before each interaction, the TMS provides observed side information data, and corresponding labels to the stereotype model. In some examples, the features in the data $f_i \in I$ are observed by the SC device (trustor), and the labels are provided as the updated trust estimation with regard to the SP device (trustee), and provided from past transactions with the trustee. Labeling in this way ensures that the trust estimated by the machine learning algorithm is semantically consistent with the trust from the experiential interaction.

An underlying assumption can be that the agent with certain patterns will adopt certain behavior, which leads to the same expected probability to provide satisfying/successful services. The rationality of selecting updated trust as the label is that this is the best that the normal trust model can estimate, so far. Consequently, it can be considered natural to assume that the next SP device with the same side information that the SC device (trustor) encounters will adopt the same trust estimation when there are is no new transaction knowledge available. According to this labeling strategy, the updated trust is used for labeling the training data for the stereotype model. During each transaction, the SC device uses one or more sensors (or other means) to collect the side information of the SP device to compose the features of the transaction.

In some implementations, a trust evaluation for a target device (SP) is requested, the stereotype model and the side information features I of the target device are provided. The stereotype model uses the trained model to produce a stereotypical trust. The TMS uses the trustworthiness estimation produced by the stereotype model as the prior trust, and combines it with the trust estimation given by the experiential trust model to form a final trust evaluation (e.g., aggregate trust score introduced above). The aggregate trust value is used for the subjective assessment of the target device in decision making process.

In some examples, the final trustworthiness evaluation is calculated based on the following example relationships:

$$b = \frac{r}{r+s+2}, d = \frac{s}{r+s+2}, u = \frac{2}{r+s+2}$$

where b is belief, d is disbelief, u is uncertainty (e.g., b, d, u can be provided through direct interaction), r denotes the number of successful interactions, s denotes the number of failure interactions, and a base rate a is the prior trust (or stereotypical trust), which is multiplied by uncertainty u. Each of the above parameters, and relationships therefor, are described in detail in The Beta Reputation System, Jøsang and Ismail, 15$^{th}$ Bled Electronic Commerce Conference, e-Reality: Constructing the e-Economy, Bled, Slovenia, Jun. 17-19, 2002, the disclosure of which is expressly incorporated herein by reference in the entirety. The Beta Reputation System is also referred to as BRS herein. In some examples, the uncertainty u can be considered as a decaying factor to weight the effect of bootstrapped trustworthiness. For example, the impact of the bootstrapped trust to a trust expectation E(w) diminishes along with interactions.

When applying a stereotype function in the IoT context, multiple domain-specific constrains arise. An example constraint is the limited capability of IoT devices. For general IoT devices, most of are cheap, embedded systems without large storage space, powerful processors, and/or charging energy supplies. Even for the most high-end smart device (e.g., the smart phone), those challenges in terms of resources and energy still exists. Therefore, rather than using a resource-demanding model, such as a deep neural network (DNN), the supervised learning algorithm should be able to capture these traits. As provided in further detail below, the present disclosure addresses selection of a machine-learning algorithm, so that the algorithm is lightweight, and swift, and provides an acceptable error bound. Another example constraint is the heterogeneity due to the nature of IoT fragmentation, where different SP devices should inherently behave differently, which will require low variance of the learning algorithm.

The problem can be formalized into a regression problem in machine learning perspective, to select an appropriate machine-learning algorithm among the various models. There are a number of machine learning algorithms, and widely accepted algorithms for supervised learning include K-nearest neighbor (KNN), linear regression (LR), artificial neural network (ANN), decision trees, support vector machine (SVM), Bayesian methods and Gaussian Processing (GP). More recently, an active area in machine-learning is deep learning, which is essentially the deep ANN structure with multiple layers. Despite the extensive analysis on machine-learning algorithms, there is no golden rule for selecting an optimal model, because the performance of different models varies from different datasets, and there can be a trade-off between training complexity and space complexity.

Implementations of the present disclosure include the decision tree as the core machine-learning algorithm for the following reasons. For example, unlike Bayesian methods and logistic/linear regression, which assumes specific distribution of the data, the decision tree is a non-parametric algorithm that may be better to generalize with the unknown IoT contextual data. The algorithm running on the IoT devices will need to tackle with various relationship among the observed data. Some data can be linear separable (correlated) where some exhibits complicated correlations. Therefore, a nonparametric algorithm is more suitable than a parametric one in the sense of generalization. Further, SVM and neural networks are widely used in real-world machine-learning problem for the advantages of their performance in terms of accuracy in experimental results. However, training SVM is equivalent to solve a QP problem, which require $O(N^3)$ computation complexity. On the other hand, although the training complexity of a neural network depends on the network structure (it can be as simple as training a perception or be extremely complicated), training a good-performed network requires a massive dataset, and relatively complex network structure. Because an objective of the present disclosure is to allow most IoT devices to build their own stereotyping model, some constrained IoT devices might not have enough storage and computation resources to conduct intensive training. Generally speaking, KNN is the least costly machine-learning algorithm, because it only computes distances between data records. However, KNN also presents high variance, because it is less expressive to capture the relationship between data features. A decision tree, on the other hand, has a number of advantages. It is easier to be interpreted, because a decision rule will be generated during querying. Another advantage of the decision tree is that it achieves good balance between low cost for training, and accuracy for testing.

In a decentralized IoT scenario, each agent possesses a subjective trust model. This agent can be as powerful as a smart phone, or be resources-constrained, like general wireless sensor networks (WSNs). Accordingly, implementations of the present disclosure consider the worst case and try to maintain the least cost. In some examples, in a decentralized setting, the experience of each agent comes in an online manner, which means the agent gets experience only after each interaction. Based on this characteristic, using online algorithm can save memory space for training the machine-learning model. For example, as time goes by, the accumulated data can take up huge read-only memory (ROM) space. Simply discarding the historical data to control the data volume and to retrain a new model can degrade the performance of the model. On the other hand, a batch training can achieve high performance by taking advantage of big data. However, this also requires relatively large random access memory (RAM) space. The benefit of an online method is that it can remember the historical knowledge, and only needs to visit the data point once to update the model.

In view of the above, implementations of the present disclosure provide a very fast decision tree (VFDT) algorithm, which can be described as a Hoeffding tree with incremental learning capability, while bounding the expectation error by Hoeffding inequality. A basic principle of a Hoeffding tree is that, in order to find the best attribute to test at a given node, it might be sufficient to consider only a small subset of the dataset. Then, the strategy for training a Hoeffding tree is to first accumulate sufficient data to figure out the best attribute to split on the root node. Once the root node is built, the succeeding data are passed down to split the corresponding leaf nodes, and so on recursively. An example Hoeffding tree algorithm is provided as Algorithm 1, below:

Algorithm 1: Hoeffding Tree

```
 1:  procedure HOEFFDING TREE(S, X, G, δ)
 2:  Let HT be a tree with a single leaf l₁ (the root).
 3:  Let X₁ = X ∪ {X_φ}
 4:  Let G̅₁(X_φ) be the G̅ obtained by predicting the most frequent
     class in S.
 5:  for each class y_k do
 6:      for each value x_ij of each attribute X_i ∈ X do
 7:          Let n_ijk(l₁) = 0.
 8:  for each example (x, y_k) in S do
 9:      Sort (x, y) into a leaf l using HT
10:      for each x_ij in x such that X_i ∈ X_l do
11:          Increment n_ijk (l)
12:      Label l with the majority class among the examples seen so
         far at l.
13:      if the examples seen so far at l are not all the same class, then
14:          Compute G̅_l for each attribute X_i ∈ X_l − {X_φ} using the
             count n_ijk(l).
15:          Let X_a be the attribute with highest G̅_l
16:          Let X_b be the attribute with second-highest G̅_l.
17:          Compute ε
18:          if G̅_l(X_a) − G̅_l(X_b) > ε and X_a ≠ X_φ then
19:              Replace l by an internal node that splits on X_a.
20:              for each branch of the split do
21:                  Add a new leaf l_m, and let X_m = X − {X_a}
22:                  Let G̅_m(X_φ) be the G̅ obtained by predicting the
                     most frequent class at l_m.
23:                  for each class y_k and each value x_ij of each
                     attribute X_i ∈ X_m − {X_φ} do
24:                      Let n_ijk(l_m) = 0.
25:  Return HT
```

A challenge of a Hoeffding tree is to determine the sufficient statistics to split the node, so that the error made on this stage is bounded by a small value. This can be achieved by using the Hoeffding bound. For example, suppose there are n independent observations of a variable with a mean $\hat{r}$. The Hoeffding bound states that, with probability 1−δ, the true mean of the variable is at least $\bar{r}$−ε, where:

$$\epsilon = \sqrt{\frac{R^2 \ln(1/\delta)}{2n}}$$

In some examples, G ($X_i$) can be the heuristic measure used to choose test attributes (e.g., the measure could be information gain, or Gini index). The Hoeffding bound ensures that, with probability 1−δ, $\Delta \bar{G} = \bar{G}(X_a) - \bar{G}(X_b) \geq \epsilon$, where $X_a$ is the correct attribute choice for split at the current node, and $X_b$ is the second best choice. In other words, this guarantees that the choice of $X_a$ is indeed the correct choice with confidence 1−δ.

The VFDT algorithm of the present disclosure is built on the Hoeffding tree, and includes enhancements. For example, in order to reduce computation complexity, the VFDT can be used to wait for a minimum number of new examples before the next update. This is particularly useful for high-speed streaming data.

An experiment on the VFDT of the present disclosure shows improvement on the comparison to other algorithms. However, it was observed that the underlining joint distribution P(X, Y) is not constant. In other words, there exists concept drift, within the observed features and the label in sampled data. The reason for this can be attributed to use of the real-time trustworthiness estimation from the host experiential trust model as the label Y for training data. However, the experiential trust model is also learning to adjust trust estimation during interactions, which means the real-time estimation might deviate from the real ground-truth (the converged trust estimation after long run). Therefore, it may be not appropriate to consider every sample to be equivalent in the training set, especially for the elder samples. One possible solution to this problem is the so-called concept drift VFDT (CVFDT).

Similar to other systems dealing with concept drift, CVFDT works by maintaining the model according to a sliding window of examples. However, an advantage of CVFDT is that it does need to be trained from scratch for all of the samples in a new window. Again, taking advantages of the Hoeffding bound, the CVFDT substitutes an outdated branch by observing sufficient statistics. When examples arrive, the CVFDT grows a subtree with the new best attribute at its root. When the subtree is more accurate on new data than the old one, the old subtree is pruned and new subtree will be replacing.

Multiple experiments were conducted to provide empirical evaluation of implementations of the present disclosure. A first experiment aimed to validate the idea of using of stereotype in a realistic IoT scenario. A second experiment compared the batch training, online training and the state-of-the-art performance in a multi-agent system (MAS) setting.

Figure 4:
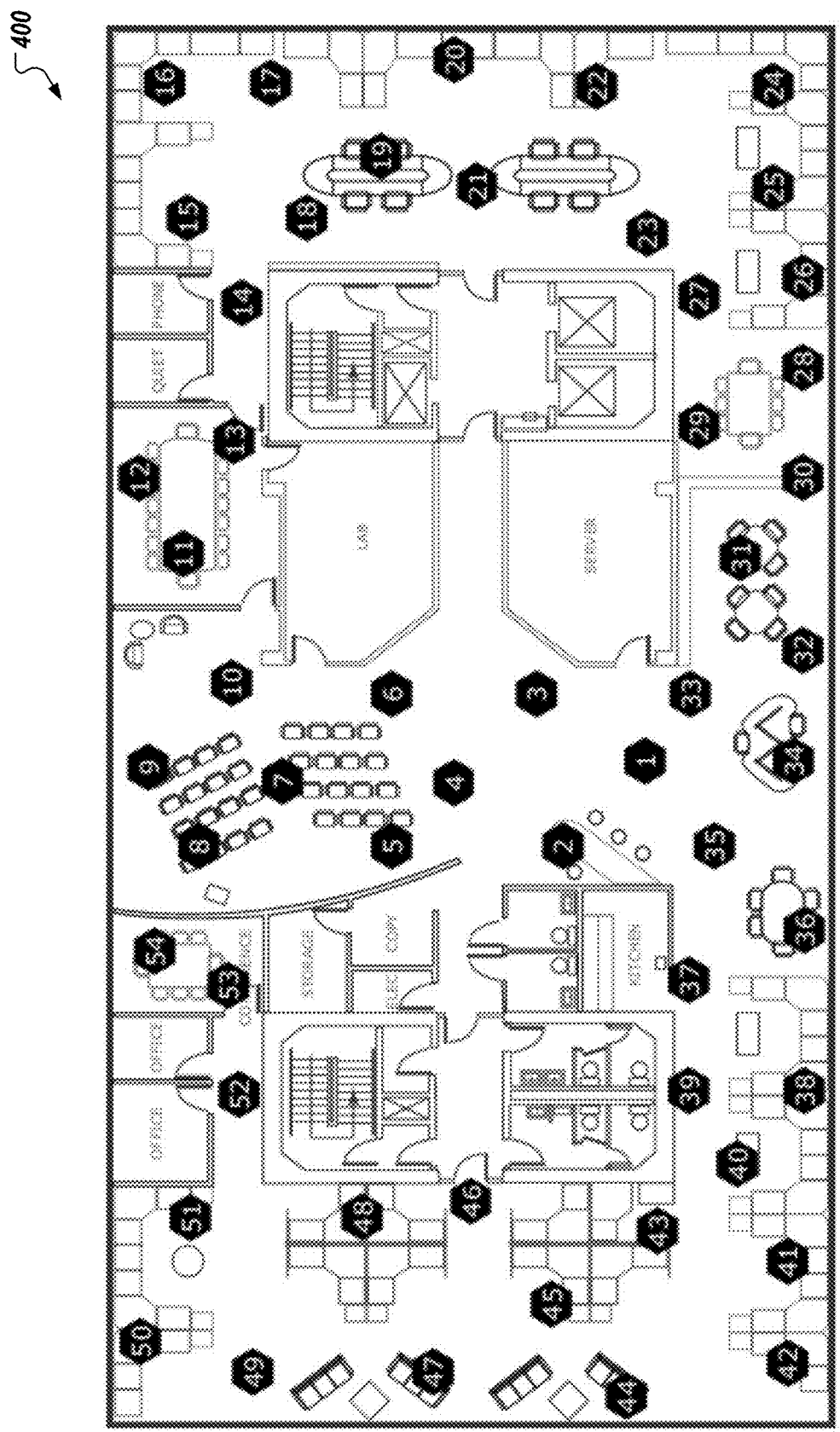
FIG. 4 depicts an example floorplan for an illustrative example of implementations of the present disclosure.

The existence of stereotype in IoT applications can be demonstrated by correlation and regression analysis using Intel Lab Data (dataset), provided by the Intel Berkeley Research Lab. As graphically depicted in FIG. 4, researchers deployed 54 motes (e.g., tiny computers for remote sensing) in different locations to build a WSN. The task of each mote is to collect environment information, and intermittently interact (share data) with the other 53 motes. The coordinates of each mote are also provided in the data along with a map 400, as depicted in FIG. 4. The dataset provides historical sensed data, and aggregated connectivity record averaged over the entire length of experiment. According to the data documentation, the relationship between two nodes is not a symmetric sensor A may hear B better than B hears from A.

The experiment is interpreted in the context of trust management by correlating the Gambetta definition of trust, and the connectivity record from the dataset. The Gambetta definition of trust can be described as trust (or, symmetrically, distrust) as a particular level of the subjective probability with which an agent assesses that another agent or group of agents will perform a particular action. In this scenario, to be consistent to the definition of trust, a trust $t^{i \to j}$ of mote (device) $d_i$ towards another mote $d_j$ is provided as the expected probability that the mote will provide successful connection. In some examples, the connectivity records correspond to the successful rate of transaction from responsor $d_j$ to requestor $d_i$. It can be seen that the trust and connectivity are semantically equivalent. The aggregated connectivity data can be used as the expectation of trust estimation over the entire experiment. Moreover, the sensed data can be considered as the side information of the mote. With regard to the mote $d_i$, the context information $C_i$ contains {temperature, humidity, light level} attributes, the profile information $P_i$ contains {coordinates, voltage}, whereas the social information $S_i$ is identical for all motes, because they all belong to the same owner (and are therefore ignored).

Because the coordinates of each mote are not meaningful alone, the distance between the mote $d_i$ and the mote $d_j$ is determined as $X_{dis}$. The other variables are denoted as $X_{temp}$, $X_{hum}$, $X_{light}$, and $X_{vol}$, respectively. As such, the side information set $I_j$, and trust estimation $t^{i \to j}$ can be obtained. A linear regression can be performed to analyze the relation between $t^{i \to j}$, the dependent variable, and $I_j$, the set of independent variables. A linear model is used instead of more complicated models (e.g., polynomial regression), because an intuitive interpretation for the regression result can be provided, and it is sufficient to showcase the stereotypes in this scenario.

For correlation and regression analysis, multi-hypothesis testing is performed: t-test and F-test with analysis of variance (ANOVA). The t-test is performed to investigate the correlation of each individual variable, and the dependent variable. The F-test is performed to investigate overall significance of the variable set in regression. The null hypothesis ($H_0$) and alternative hypothesis ($H_1$) for the F-test is shown as below, and the numerical result is shown in Table 1:

$H_0$: The fit of the nonvariable model and the model are equal.

$H_1$: The fit of the nonvariable model is significantly reduced compared to the model.

TABLE 1

Result of F-Test

|   | DF | Sum Sq. | Mean Sq. | F Value | Pr(>F) | Sig. Code |
|---|---|---|---|---|---|---|
| X | 5 | 41.939 | 8.3877 | 482.9 | <2.2e–16 | *** |

Sig. Codes → 0 '*' 0.001 '' 0.01 '*' 0.05 '.' 0.1 ' ' 1

From the last column of Table 1, it can be observes that the p-value is less than the significant level of 0.0001. Therefore, the result is statistically significant, and there is over 99.9% confidence that the null hypothesis $H_0$ can be rejected, and the alternative hypothesis $H_1$ accepted. In other words, the independent variables ($I_j$) are jointly, significantly linearly correlated with the dependent variable ($t^{i \to j}$). To this end, it can be stated that the stereotype (i.e., the correlation of side information and trust) exists and is significant in this application.

To further analyze the effect of each variable, the t-test is conducted. The null hypothesis, and the alternative hypothesis are shown below, and the results are shown in Table-2:

$H_0$: the regression coefficients are equal to zeros.

$H_1$: the regression coefficients are not equal to zeros.

TABLE 2

Result of F-Test

|   | Coeff. | Std. Error | t value | Pr(>F) | Sig. Code | Impact |
|---|---|---|---|---|---|---|
| $X_{dis}$ | −0.68229 | 0.01403 | −48.634 | <2.2e–16 | *** | −0.8817 |
| $X_{temp}$ | −0.23887 | 0.02363 | −10.107 | <2.2e–16 | *** | −0.3317 |
| $X_{hum}$ | −0.14127 | 0.02299 | −6.144 | 9.40e–10 | *** | −0.2087 |
| $X_{light}$ | 0.11286 | 0.01591 | 7.092 | 1.74e–12 | *** | 0.1340 |
| $X_{vol}$ | 0.10931 | 0.02223 | 4.916 | 9.42e–07 | *** | 0.0894 |

Sig. Codes → 0 '*' 0.001 '' 0.01 '*' 0.05 '.' 0.1 ' ' 1

The rationality of the above hypothesis is that, if there is significant linear relationship between the independent variables $X_k \in I$, and the dependent variable ($t^{i \to j}$), then the coefficient will not equal zero. In Table 2, the first column displays the coefficient referring to each variable, the second column shows the standard error of the coefficient, the third column shows the t statistic with regard to the coefficient, the fourth column computes the p-value of t-test, the fifth column demonstrates the significance of the coefficient and the last column is computed by the following example relationship, which demonstrates the impact of variable $X_k$ on the variance of $t^{i \to j}$:

$$\text{impact}_{X_i} = \frac{coef(X_i) * Std. \ deviation(X_i)}{Mean(Y)}$$

Results from Table 2 show that each coefficient of the variable is significantly different than zero. As noted above with respect to the F-test, the null hypothesis $H_0$ can be rejected with significant level 1%, and the alternative hypothesis $H_1$ can be accepted. In other words, each variable is significantly linearly correlated with the trust value $T_{ij}$. In this specific case, the coefficient column reveals the following: the larger the distance between two motes, the poorer the connectivity; the lower the temperature the better the connectivity (e.g., this can be explained by the fact that higher temperature usually degrades the hardware performance); the lower the humidity, the better the connectivity (e.g., this can be explained by the fact that high humidity impacts the stability of electronic circuit); the brighter the light, the better the connectivity (e.g., the lighter area could also be the space with less obstacles); and the higher the voltage, the better the connectivity (e.g., the mote with less power to transmit also has lower voltage).

Concretely, the impact value demonstrates that, when independent variable $X_k$ changes with a unit of standard deviation σ, the response $t^{i \to j}$ will change by {impact} percent. Take $X_{light}$, for example, when it increase a unit of standard deviation, $t^{i \to j}$ increases by 13.4% in its mean value. As can be seen, most of the variables induce a change in $t^{i \to j}$ by over 10% when changes a unit of standard deviation, which is a non-trivial result. Consequently, it can be said that the variables have significant impact on trust.

To evaluate the effectiveness of VFDT, a simulation test-bed can be deployed. In a simulation setup, a set of trustor agents X interact with a set of trustees Y over a number of rounds. Each trustee is assigned a performance profile, which determines how it will behave. Example trustee profiles are provided below in Table 3 (where Id. is the respective profile identifier, mean is the outcome mean, and SD is standard deviation).

TABLE 3

Trustee Profiles

| Id. | Mean | SD | f1 | f2 | f3 | f4 | f5 | f6 | +noise |
|---|---|---|---|---|---|---|---|---|---|
| $p_1$ | 0.9 | 0.05 | x |   |   |   | x |   | ... |
| $p_2$ | 0.6 | 0.15 |   | x | x |   |   |   | ... |
| $p_3$ | 0.4 | 0.15 |   |   | x | x |   |   | ... |
| $p_4$ | 0.3 | 0.05 |   | x | x | x |   |   | ... |
| $p_5$ | 0.5 | 1.00 |   | x | x |   | x |   | ... |

Each profile specifies the mean and standard deviation parameters of a Gaussian distribution, from which simulated interaction outcomes will be drawn (e.g., from the range [0,1]). In addition, each profile also specifies a number of noise features ($N_{nf}$), which are not related to the profile. This enables testing of the stereotype model's ability to deal with noisy information. In this manner, the target feature-behavior relationships the agents are to identify can be defined. For simplicity, all features are represented as binary variables, each one signifying presence or absence of a given feature.

The outcome value is presented in a continuous manner, whereas the BRS, for example, requires a binomial number r or s. The decision function is selected as a threshold function. More particularly, when the trust is larger than the threshold T, a transaction is recognized as successful.

Though every agent can hold a subjective utility function, again for simplicity, each utility function is set equally, with T equal to 0.5.

During simulation, each trustor is randomly assigned to a team, where the number of the teams and other experimental parameters are listed in Table 4. In each round, the trustor decides to interact with probability $P_f$, and each agent can only interact with other agents in the team. This emulates the situation when the device owner enters the service provision range of the SPs. The SP with the trustworthiness according to the subjective trust model is selected for interaction. The simulation system maintains a team life span, such that, when a team's lifetime expires, the simulation breaks up the team and stochastically forms an ad hoc team again.

TABLE 4

Experimental Parameters

| Parameter | Value | Description |
| --- | --- | --- |
| $N_{agents}$ | 500 | Trustee agent count |
| $N_{trustors}$ | 20 | Trustor agent count |
| $N_{groups}$ | 20 | Ad-hoc group count |
| $N_{nf}$ | 6 | No. of noise features |
| $P_I$ | 0.8 | Interaction probability |
| $G_{lt}$ | 5 | Ad-hoc group lifetime |
| $G_{size}$ | 10 | Ad-hoc group size |

Results of the instant experiment can be compared with other approaches in terms of accuracy measured by rooted mean square error (RMSE). To come up with the ground-truth (the converged trust estimation) of each profile, trustors interact with trustees with different profiles for a sufficiently large number of interactions, until the trust estimation converges. Note that, this ground-truth is used only for measuring the RMSE, and will not provide any guidance for the subjective trust model.

In one prior approach, referred to as Burnett's approach, a learning interval L is preset, and the stereotyping model updates only at the end of the learning interval. However, it can be argued that using historical records can outperform this prior approach. A training with full historical data is conducted. To exploit the benefit of historical data, while reducing the cost (both in time and space), VFDT is used for online training. The experimental results show that using historical data provides more rapid convergence, and smaller error than other approaches, such as Burnett's approach. Accordingly, using online training outperforms Burnett's approach, which only train the model at the end of a given interval.

Figure 5:
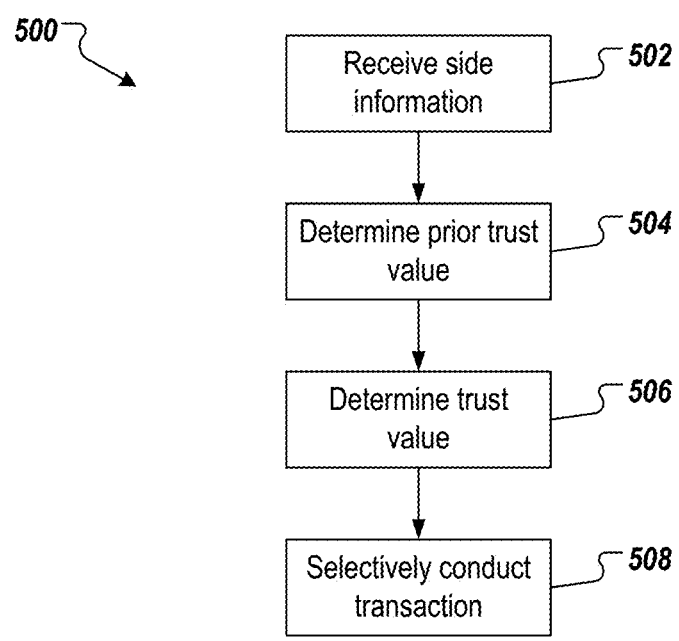
FIG. 5 an example process that can be executed in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices. The example process 500 can be performed to provide a trust management system in connected devices including a service provider device and a service consumer device.

Side information associated with the service provider device is received (502). In some examples, the trust management system receives the side information. For example, the service consumer device can receive the side information. The side information includes profile data and context data associated with the service provider device. In some examples, the profile data includes one or more of hardware model, owner, and remaining energy of the service provider device, and the context data includes one or more of location, time, temperature, humidity, and light. In some examples, the side information further includes social data representative of a relationship between an owner of the service provider device, and an owner of the service consumer device.

The side information processes the side information using a computer-executable stereotype model to determine a prior trust value (504). In some examples, the trust management system processes the side information. For example, the service consumer device processes the side information. In some examples, the stereotype model at least partially includes a very fast decision tree (VFDT). A trust value is determined using a computer-executable experiential trust model (506). In some examples, the trust management system determines the trust value. For example, the service consumer device determines the trust value. The trust value is at least partially based on the prior trust value.

A transaction between the service consumer device, and the service provider device is selectively conducted based on the trust value (508). In some examples, selectively conducting a transaction between the service consumer device, and the service provider device based on the trust value includes determining that the trust value exceeds a trust value threshold, and in response, conducting the transaction. In some examples, the transaction includes communicating data between the service consumer device, and the service provider device.

Implementations of the present disclosure provide one or more of the following example advantages. The present disclosure provides the first investigation of application of stereotypical trust in IoT systems, and introduces the social concept of stereotype to machine-to-machine trust. The present disclosure provides machine-learning based techniques of implementing such concepts into practice. Further, by adapting the CVFDT in accordance with the present disclosure, the learning process for establishing stereotypical trust is able to be implemented in relatively inexpensive, and resources-constrained IoT devices, which is a long-known problem for IoT devices, due to the computationally efficient, while effective nature of the adapted CVFDT. Moreover, the concept-drift capacity of CVFDT enables the IoT devices for active learning, which addresses issues of highly dynamic IoT ecosystems.

Figure 6:
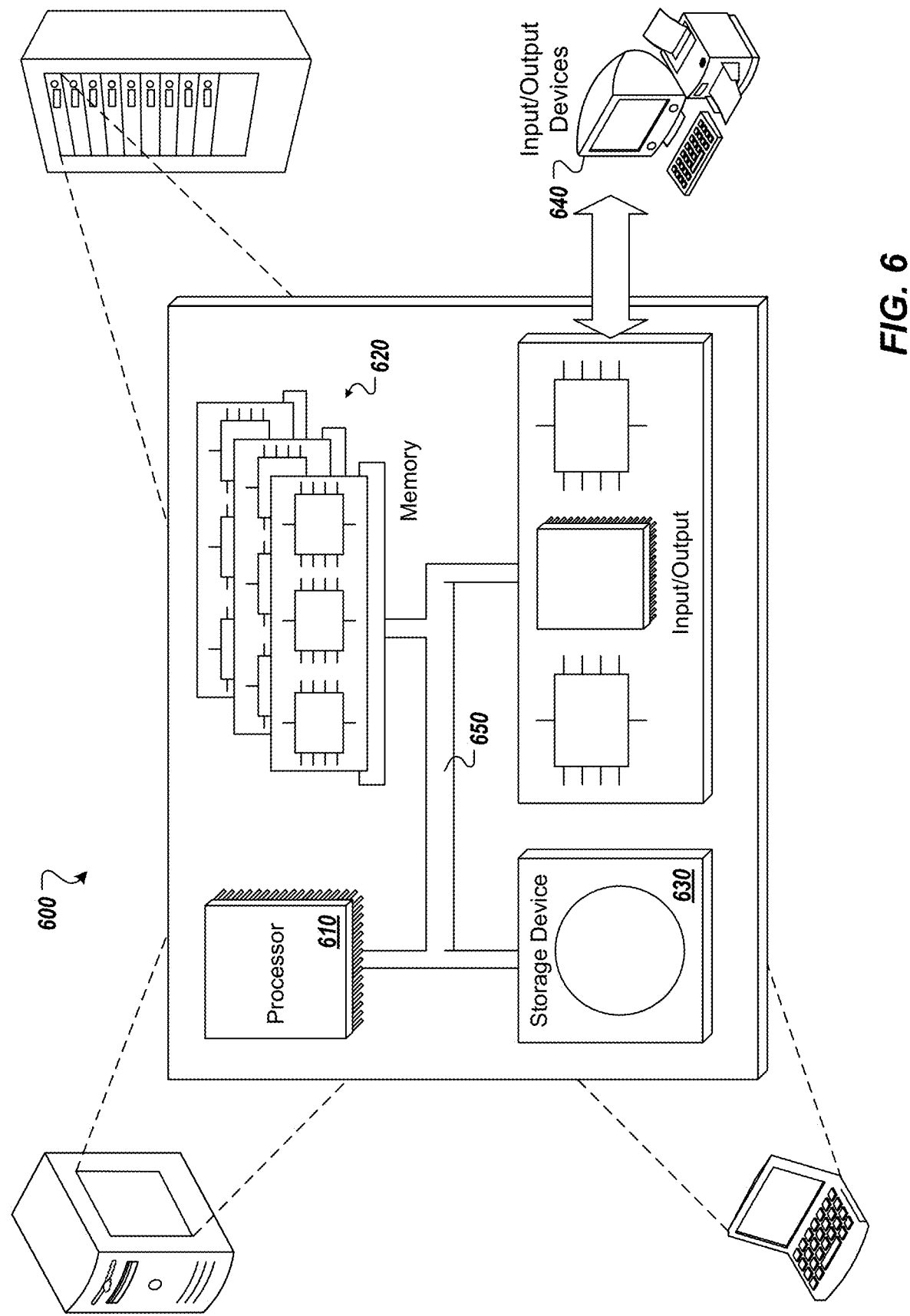
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for a trust management system in connected devices comprising a service provider device and a service consumer device, the method being executed by one or more processors and comprising:
   receiving, by the trust management system, side information associated with the service provider device, the service provider device being included in an Internet-of-Things (IoT) system comprising a plurality of service provider devices, the side information comprising profile data and context data;
   processing, by the trust management system, the side information using a computer-executable stereotype model to determine a prior trust value, the stereotype model trained using features in data observed by the service consumer device and labels provided from an updated trust determined by a computer-executable experiential trust model;
   determining, by the trust management system, a direct trust value and one or more indirect trust values, each of the one or more indirect trust values being provided from a respective other service consumer device that have previously transacted with the service provider device;
   determining, by the trust management system, a trust value using the experiential trust model, and at least partially based on the prior trust value, the direct trust value, and the one or more indirect trust values, the experiential trust model comprising a machine-learned stereotype function that provides the trust value; and
   selectively conducting a transaction between the service consumer device, and the service provider device based on the trust value when the service consumer device is in communication range of the service provider device within the IoT system.

2. The method of claim 1, wherein the side information further comprises social data representative of a relationship between an owner of the service provider device, and an owner of the service consumer device.

3. The method of claim 1, wherein the profile data comprises one or more of hardware model, owner, and remaining energy of the service provider device, and the context data comprises one or more of location, time, temperature, humidity, and light.

4. The method of claim 1, wherein selectively conducting a transaction between the service consumer device, and the service provider device based on the trust value comprises determining that the trust value exceeds a trust value threshold, and in response, conducting the transaction.

5. The method of claim 1, wherein the transaction comprises communicating data between the service consumer device, and the service provider device.

6. The method of claim 1, wherein the stereotype model at least partially comprises a very fast decision tree (VFDT).

7. The method of claim 1, wherein the trust management system is at least partially executed by each of the service consumer device and the service provider device.

8. A non-transitory computer-readable storage medium coupled to one or more processors and having instructions stored thereon which, when executed by the one or more processors, cause the one or more processors to perform operations for a trust management system in connected devices comprising a service provider device and a service consumer device, the operations comprising:
  receiving, by the trust management system, side information associated with the service provider device, the service provider device being included in an Internet-of-Things (IoT) system comprising a plurality of service provider devices, the side information comprising profile data and context data;
  processing, by the trust management system, the side information using a computer-executable stereotype model to determine a prior trust value, the stereotype model trained using features in data observed by the service consumer device and labels provided from an updated trust determined by a computer-executable experiential trust model;
  determining, by the trust management system, a direct trust value and one or more indirect trust values, each of the one or more indirect trust values being provided from a respective other service consumer device that have previously transacted with the service provider device;
  determining, by the trust management system, a trust value using the experiential trust model, and at least partially based on the prior trust value, the direct trust value, and the one or more indirect trust values, the experiential trust model comprising a machine-learned stereotype function that provides the trust value; and
  selectively conducting a transaction between the service consumer device, and the service provider device based on the trust value when the service consumer device is in communication range of the service provider device within the IoT system.

9. The computer-readable storage medium of claim 8, wherein the side information further comprises social data representative of a relationship between an owner of the service provider device, and an owner of the service consumer device.

10. The computer-readable storage medium of claim 8, wherein the profile data comprises one or more of hardware model, owner, and remaining energy of the service provider device, and the context data comprises one or more of location, time, temperature, humidity, and light.

11. The computer-readable storage medium of claim 8, wherein selectively conducting a transaction between the service consumer device, and the service provider device based on the trust value comprises determining that the trust value exceeds a trust value threshold, and in response, conducting the transaction.

12. The computer-readable storage medium of claim 8, wherein the transaction comprises communicating data between the service consumer device, and the service provider device.

13. The computer-readable storage medium of claim 8, wherein the stereotype model at least partially comprises a very fast decision tree (VFDT).

14. The computer-readable storage medium of claim 8, wherein the trust management system is at least partially executed by each of the service consumer device and the service provider device.

15. A system, comprising:
  a computing device; and
  a computer-readable storage device coupled to the computing device and having instructions stored thereon which, when executed by the computing device, cause the computing device to perform operations for a trust management system in connected devices comprising a service provider device and a service consumer device, the operations comprising:
    receiving, by the trust management system, side information associated with the service provider device, the service provider device being included in an Internet-of-Things (IoT) system comprising a plurality of service provider devices, the side information comprising profile data and context data;
    processing, by the trust management system, the side information using a computer-executable stereotype model to determine a prior trust value, the stereotype model trained using features in data observed by the service consumer device and labels provided from an updated trust determined by a computer-executable experiential trust model;
    determining, by the trust management system, a direct trust value and one or more indirect trust values, each of the one or more indirect trust values being provided from a respective other service consumer device that have previously transacted with the service provider device;
    determining, by the trust management system, a trust value using the experiential trust model, and at least partially based on the prior trust value, the direct trust value, and the one or more indirect trust values, the experiential trust model comprising a machine-learned stereotype function that provides the trust value; and
    selectively conducting a transaction between the service consumer device, and the service provider device based on the trust value when the service consumer device is in communication range of the service provider device within the IoT system.

16. The system of claim 15, wherein the side information further comprises social data representative of a relationship between an owner of the service provider device, and an owner of the service consumer device.

17. The system of claim 15, wherein the profile data comprises one or more of hardware model, owner, and remaining energy of the service provider device, and the context data comprises one or more of location, time, temperature, humidity, and light.

18. The system of claim 15, wherein selectively conducting a transaction between the service consumer device, and the service provider device based on the trust value comprises determining that the trust value exceeds a trust value threshold, and in response, conducting the transaction.

19. The system of claim 15, wherein the transaction comprises communicating data between the service consumer device, and the service provider device.

20. The system of claim 15, wherein the stereotype model at least partially comprises a very fast decision tree (VFDT).

* * * * *